United States Patent
Li

(10) Patent No.: US 12,339,907 B2
(45) Date of Patent: Jun. 24, 2025

(54) METHODS AND APPARATUSES FOR AUTOMATICALLY COMPLETING QUERY STATEMENT FOR GRAPH DATABASE

(71) Applicant: Alipay (Hangzhou) Information Technology Co., Ltd., Zhejiang (CN)

(72) Inventor: Pengfei Li, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/474,789

(22) Filed: Sep. 26, 2023

(65) Prior Publication Data

US 2024/0104139 A1 Mar. 28, 2024

(30) Foreign Application Priority Data

Sep. 26, 2022 (CN) .......................... 202211173516.7

(51) Int. Cl.
| | |
|---|---|
| *G06F 16/90* | (2019.01) |
| *G06F 16/242* | (2019.01) |
| *G06F 16/901* | (2019.01) |
| *G06F 16/903* | (2019.01) |
| *G06F 16/9032* | (2019.01) |

(52) U.S. Cl.
CPC .... *G06F 16/90324* (2019.01); *G06F 16/2423* (2019.01); *G06F 16/9024* (2019.01); *G06F 16/90344* (2019.01)

(58) Field of Classification Search
CPC .............. G06F 16/242; G06F 16/2423; G06F 16/2433; G06F 16/24534; G06F 16/284; G06F 16/9024; G06F 16/90324; G06F 16/90344
See application file for complete search history.

(56) References Cited

U.S. PATENT DOCUMENTS

| | | | |
|---|---|---|---|
| 9,292,537 B1 * | 3/2016 | Lee ........................ | G06F 16/164 |
| 2006/0224553 A1 * | 10/2006 | Chtcherbatchenko ....................... G06F 40/274 |
| 2014/0156262 A1 * | 6/2014 | Yuen .................... | G06F 16/3323 704/9 |
| 2020/0356254 A1 * | 11/2020 | Missig ................. | G06F 3/04883 |
| 2023/0076923 A1 * | 3/2023 | Sun ......................... | G06N 20/00 |

FOREIGN PATENT DOCUMENTS

CN 116108245 5/2023

* cited by examiner

*Primary Examiner* — Diedra McQuitery
(74) *Attorney, Agent, or Firm* — Fish & Richardson P.C.

(57) ABSTRACT

Automatically completing a query statement for a graph database, includes a current input character in a process where a user inputs a graph database query statement based on a target query language. Multiple syntax keywords for matching target keywords are queried based on at least the current input character when the current input character is not a predetermined character, where the predetermined character is a reserved character of the target query language. The matched target keywords are determined as auto-complete content corresponding to the current input character.

20 Claims, 3 Drawing Sheets

… (1)

METHODS AND APPARATUSES FOR AUTOMATICALLY COMPLETING QUERY STATEMENT FOR GRAPH DATABASE

CROSS-REFERENCE TO RELATED APPLICATIONS

This application claims priority to Chinese Patent Application No. 202211173516.7, filed on Sep. 26, 2022, which is hereby incorporated by reference in its entirety.

TECHNICAL FIELD

One or more embodiments of this specification relate to the database field, and in particular, to methods and apparatuses for automatically completing a query statement for a graph database.

BACKGROUND

To improve query efficiency of a graph database, in the process in which a user inputs a graph database query statement (referred to as a graph query statement), a query statement editor (referred to as an editor) needs to be able to derive, based on query content that has been input by the user, multiple options for selection by the user. The multiple options here are also referred to as auto-complete content. Privacy data can be stored in the graph database.

In the conventional technology, the editor can only complete specific content input by the user. Therefore, it is necessary to provide a more comprehensive graph query statement completion solution.

SUMMARY

One or more embodiments of this specification describe methods for automatically completing a query statement for a graph database, so that completion using a plurality of pieces of content such as syntax keywords can be implemented.

According to a first aspect, a method for automatically completing a query statement for a graph database is provided, including the following: a current input character is obtained in a process where a user inputs a graph database query statement based on a target query language; when the current input character is not a predetermined character, multiple syntax keywords are queried for matching target keywords based on at least the current input character, where the predetermined character is a reserved character of the target query language; and the target keywords are determined as auto-complete content corresponding to the current input character.

According to a second aspect, an apparatus for automatically completing a query statement for a graph database is provided, including: an acquisition unit, configured to obtain a current input character in a process where a user inputs a graph database query statement based on a target query language; a querying unit, configured to query multiple syntax keywords for matching target keywords based on at least the current input character when the current input character is not a predetermined character, where the predetermined character is a reserved character of the target query language; and a determining unit, configured to determine the target keywords as auto-complete content corresponding to the current input character.

According to a third aspect, a computer storage medium is provided. The computer storage medium stores a computer program, and when the computer program is executed in a computer, the computer is enabled to perform the method of the first aspect.

According to a fourth aspect, a computing device is provided, including a memory and a processor. The memory stores executable code, and when executing the executable code, the processor implements the method of the first aspect.

According to the methods and the apparatuses for automatically completing a query statement for a graph database provided in the one or more embodiments of this specification, in the process where the user inputs the graph database query statement based on the target query language, the multiple syntax keywords are queried for the matching target keywords and used as the auto-complete content if the current input character of the user is not the predetermined character, so that syntax keyword input efficiency is improved, thereby improving query efficiency of the graph database.

BRIEF DESCRIPTION OF DRAWINGS

To describe technical solutions in embodiments of this specification more clearly, the following briefly describes the accompanying drawings needed for describing the embodiments. Clearly, the accompanying drawings in the following description merely show some embodiments of this specification, and a person of ordinary skill in the art can still derive other drawings from these accompanying drawings without creative efforts.

DESCRIPTION OF EMBODIMENTS

The solutions provided in this specification are described below with reference to the accompanying drawings.

Figure 1:
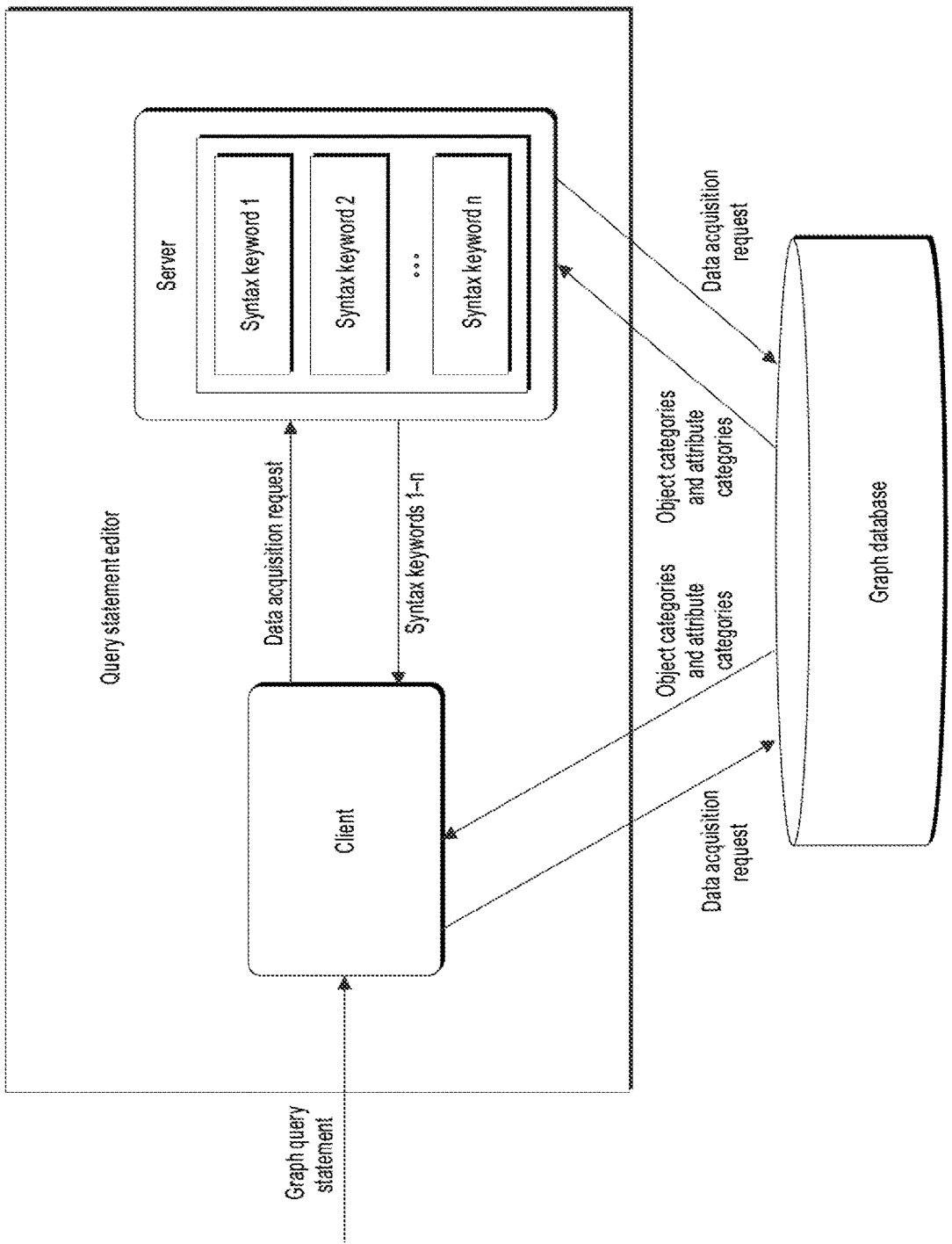
FIG. 1 is a schematic diagram illustrating an implementation scenario, according to one or more embodiments disclosed in this specification.

FIG. 1 is a schematic diagram illustrating an implementation scenario, according to one or more embodiments disclosed in this specification. In FIG. 1, a user can input a graph database query statement (referred to as a graph query statement, which is described in detail later) based on a target query language (for example, an International Standard Graph Query Language (ISO GQL) or a cypher language) by using a query statement editor to perform a query in a target graph database.

The query statement editor can further include a client and a server. The server can store multiple syntax keywords. For example, if the target query language is the ISO GQL or the cypher language, the syntax keywords here can be "MATCH", "RETURN", "LIMIT", etc.

The target graph database can store multiple relationship network graphs, and each of the relationship network graphs includes multiple nodes and edges between the nodes. The node and the edge are collectively referred to as a graphic element of the relationship network graph, and the graphic element has the following related information: an object category, an attribute category, an element identifier, etc. of an object (including an entity or a relationship) represented by the graphic element. Certainly, when the graphic element is an edge, related information of the edge can further include a start-point identifier, an end-point identifier, etc.

In some examples, the client of the query statement editor can pre-obtain, from the server, the multiple syntax keywords stored in the server. Then the client can perform syntax keyword completion for the graph query statement input by the user.

Specifically, a current input character is obtained in the process where the user inputs the graph database query statement based on the target query language. When the current input character is not a predetermined character, the multiple syntax keywords are queried for the matching target keywords based on at least the current input character. The predetermined character is a reserved character of the target query language. The target keywords are determined as auto-complete content corresponding to the current input character.

Certainly, in practice, the server can alternatively perform syntax keyword completion for the graph query statement input by the user. It should be understood that when the server performs syntax keyword completion, the client needs to send a character input by the user to the server in real time. Then, after determining the auto-complete content, the server returns the auto-complete content to the client, so that the client presents at least a part of the auto-complete content to the user.

In addition, the client or the server of the query statement editor can further complete the query statement by using content such as an object category or an attribute category. A corresponding completion method is described in detail later.

The following describes the above-mentioned graph query statement in detail:

The graph query statement includes at least a MATCH clause and a RETURN clause.

For example, the graph query statement can be MATCH (n: person)–[r: rating]–(m: movie) RETURN n.name, r.starts, m.title.

The MATCH clause in the above-mentioned graph query statement can include a matching expression (also referred to as a path), and the matching expression includes nodes, edges, or both.

In some examples, the matching expression can be represented as "(n)—[r]—(m)", where "( )" is a pair of first-type symbols (referred to as first-type symbols) corresponding to a node, and the letters n and m between the symbols are user-defined variable names and are respectively used to describe two nodes, which can represent two entities of different entity categories. "[ ]" is a pair of second-type symbols (referred to as second-type symbols) corresponding to an edge, and the letter between the symbols is a user-defined variable name used to describe an edge, which can represent a relationship between entities. In addition, "—[r]—" indicates that an edge between nodes is a non-directional edge or a bidirectional edge, and can also be replaced with "—[r]—>" and "<—[r]—", respectively indicating an incoming edge and an outgoing edge. It should be understood that the incoming edge and the outcoming edge here are relative to node n.

Certainly, in practice, a corresponding object category can be further set for an object represented by a node or an edge. For example, the matching expression can alternatively be "(n: person)–[r: rating]—(m: movie)", where "person" is an entity category of an entity represented by node n, "movie" is an entity category of an entity represented by node m, and "rating" is a relationship category of a relationship represented by edge r.

It should be understood that based on the above-mentioned matching expression, multiple network sub-graphs can be matched from the relationship network graph to be queried.

The RETURN clause can include multiple query fields, and each of the query fields can be any one of the following: a path, a node, a connection edge, an attribute category, a target function, etc. For example, the target function can be an aggregation function.

Taking the above-mentioned graph query statement as an example, the query fields in the RETURN clause include n.name, r.starts, and m.title. "name" is an attribute category of the entity category "person" of the entity represented by node n, "title" is an attribute category of the entity category "movie" of the entity represented by node m, and "starts" is an attribute category of the relationship category "rating" of the relationship represented by edge r.

It is worthwhile to note that the above-mentioned graph query statement can further include another clause, for example, a LIMIT clause, which is used to limit a quantity of returned query results. Details are omitted for simplicity in this specification.

Figure 2:
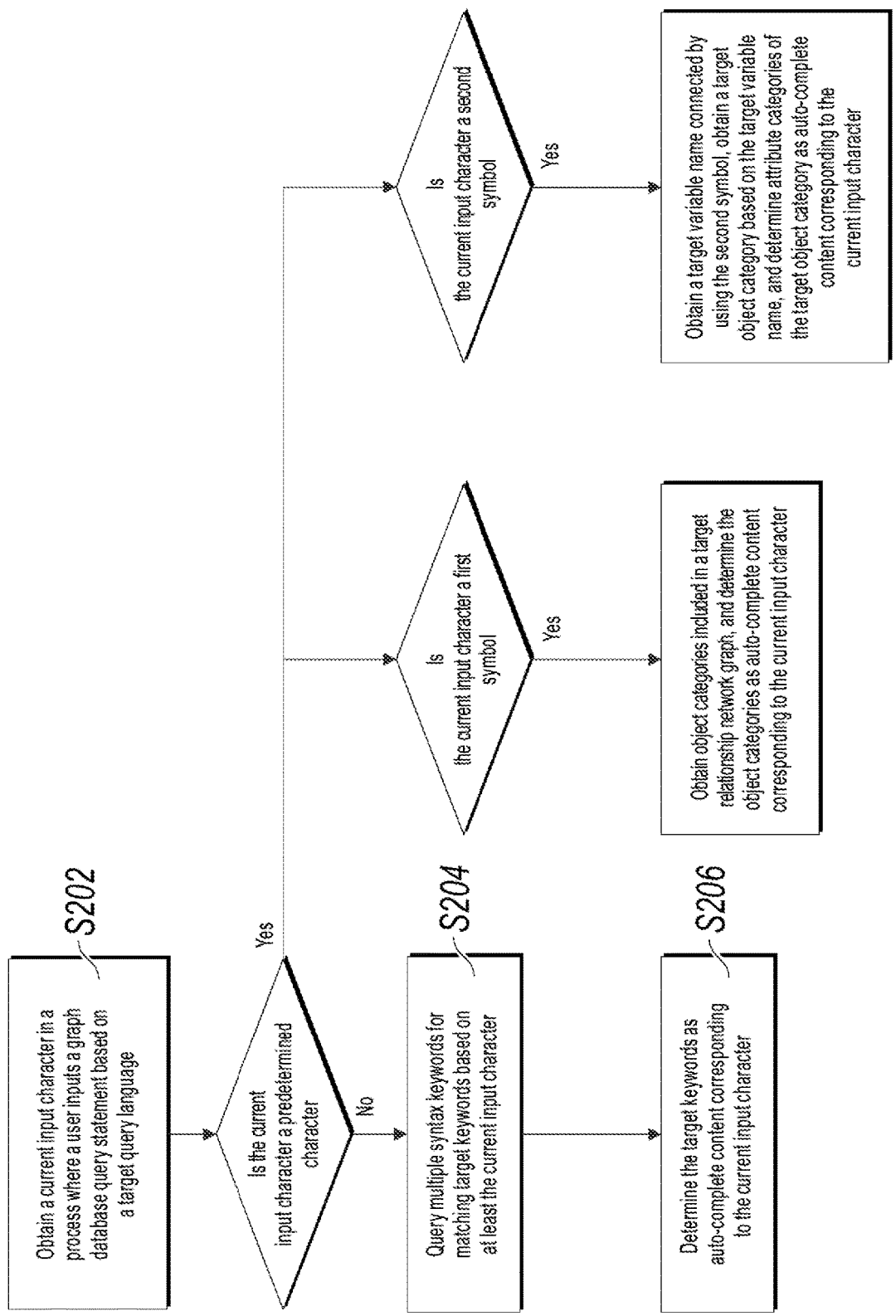
FIG. 2 is a flowchart illustrating a method for automatically completing a query statement for a graph database, according to one or more embodiments.

FIG. 2 is a flowchart illustrating a method for automatically completing a query statement for a graph database, according to one or more embodiments. The method can be performed by any system, device, platform, or device cluster with computing and processing capabilities. For example, the method is performed by the client or the server of the query statement editor in FIG. 1. As shown in FIG. 2, the method can include the following steps:

Step 202: Obtain a current input character in a process where a user inputs a graph database query statement based on a target query language.

Optionally, a selection instruction of the user can be first received before the current input character is obtained, where the selection instruction is used to select a target relationship network graph from a target graph database. Then the client or the server of the query editor can send a data acquisition request to the target graph database. The data acquisition request is used to request to obtain object categories and attribute categories of objects represented by graphic elements in the target relationship network graph.

The graphic element here includes a node, an edge, or both. An object represented by the node is an entity. An object represented by the edge is a relationship. Therefore, the object categories include entity categories, relationship categories, or both. For example, if the target relationship network graph is a character relationship network graph, the entity category of the entity represented by the node can be person, movie, occupation, etc. The relationship category of the relationship represented by the node can be acted_in, rating, etc.

In addition, the objects represented by the graphic element can have multiple attribute categories, and objects that belong to different object categories correspond to different attribute categories. For example, an attribute category of the entity category "person" can be identity, job, or hobby. For example, an attribute category of the entity category "movie" can be actor, director, or movie length. For example, an attribute category of the relationship category "acted_in" can be role. For example, an attribute category of the entity category "rating" can be stars.

The client or the server of the query editor can locally cache the object categories and the attribute categories after obtaining the object categories and the attribute categories. Then the server can complete the graph query statement input by the user by using content such as a syntax keyword, an object category, or an attribute category.

In addition, the client of the query statement editor can also obtain, from the server, multiple syntax keywords stored in the server. Therefore, the client can also complete the graph query statement input by the user by using content such as a syntax keyword, an object category, or an attribute category.

Returning to step 202, if step 202 is performed by the client of the query statement editor, the client can directly obtain the current input character. If step 202 is performed by the server of the query statement editor, the server can receive, from the client, the current input character obtained by the client.

Step 204: When the current input character is not a predetermined character, multiple syntax keywords are queried for matching target keywords based on at least the current input character.

The predetermined character is a reserved character of the target query language. For example, if the target query language is an ISO GQL or a cypher language, the reserved character here can be ":", ".", etc.

For example, if the target query language is the ISO GQL or the cypher language, the syntax keywords here can be "MATCH", "RETURN", "LIMIT", etc.

In some examples, the current input character is the beginning character, and the querying matching target keywords can include: header matching is performed on the current input character and the multiple pre-stored syntax keywords to obtain the target keywords.

In some other examples, the current input character is not a beginning character, and the querying for matching target keywords can include: multiple consecutive characters including the current input character are obtained in a backward order starting from the current input character, and a target character string is formed based on an input sequence of the characters; and the multiple syntax keywords are queried for the matching target keywords based on the target character string.

It is worthwhile to note that "consecutive" means that there is no space between the characters. Therefore, a termination condition for obtaining multiple characters in a backward order is to arrive at the last space or the beginning of the graph query statement.

For example, assuming that query content that has been input by the user is "MAT", in other words, the current input character is "T", the obtained multiple characters are "T", "A", and "M", and a target character string "MAT" is obtained after the characters are concatenated based on an input sequence of the characters.

Step 206: Determine the target keywords as auto-complete content corresponding to the current input character.

If step 206 is performed by the client of the query statement editor, the client can present at least a part of the auto-complete content to the user for selection by the user.

If step 206 is performed by the server of the query statement editor, the server can first return the determined auto-complete content to the client, and then the client presents at least a part of the auto-complete content to the user for selection by the user.

It is worthwhile to note that a syntax keyword input by the user can be further highlighted.

The syntax keyword completion method is described above. The following describes an object category completion method.

Specifically, when the current input character is a first symbol, object categories included in the target relationship network graph are obtained, and the object categories are determined as the auto-complete content corresponding to the current input character.

The first symbol here is used to connect a user-defined variable name and an object category of an object represented by a graphic element described by the variable name, and is included in an input combination limited by a predetermined pair of symbols. Different types of the pair of symbols here indicate whether the graphic element is a node or an edge.

For example, if the target query language is the ISO GQL or the cypher language, the first symbol can be ":", etc.

Taking the above-mentioned graph query statement as an example, variable names and object categories connected by first symbols are respectively "n" and "person", "m" and "movie", and "r" and "rating". In addition, the first symbol is included in an input combination "0" or "[ ]". "( )" indicates that the graphic element is a node, and "[ ]" indicates that the graphic element is an edge.

In some examples, that object categories included in the target relationship network graph are obtained can include the following: when the pair of symbols are first-type symbols corresponding to a node, entity categories of entities represented by nodes in the target relationship network graph are obtained, and the entity categories are determined as the auto-complete content corresponding to the current input character; or when the pair of symbols are second-type symbols corresponding to an edge, relationship categories of relationships represented by edges in the target relationship network graph are obtained, and the relationship categories are determined as the auto-complete content corresponding to the current input character.

Still taking the above-mentioned graph query statement as an example, assuming that query content that has been input by the user is "MATCH(n:)", in other words, the current input character is ":", entity categories included in the target relationship network graph, for example, "person" and "movie", can be determined as auto-complete content of ":".

It is worthwhile to note that a pair of symbols are usually input at the same time in the query statement editor. For example, when the user inputs "(", the editor makes auto-completion using ")". For another example, when the user inputs "[", the editor makes auto-completion using "]".

Because a pair of symbols are input at the same time, the current input character can be ":" when the user inputs the previous query content.

Still taking the above-mentioned graph query statement as an example, assuming that query content that has been input by the user is "MATCH(n: person)—[r:]", in other words, the current input character is ":", relationship categories included in the target relationship network graph, for example, "acted_in" and "rating", can be determined as auto-complete content of ":".

It is worthwhile to note that after at least a part of the auto-complete content of ":" is presented to the user, the user can select an object category from at least the part of the auto-complete content, or can continue to input a character (referred to as a first character). When the user continues to input a character, this solution can further include the following steps:

at least one first character consecutively input after the current input character is obtained, to form a first character string; and the object categories are queried for a matching target object category based on the first character string, and the target object category is determined as auto-complete content corresponding to the at least one first character.

For example, in the previous examples, after "person" and "movie" are presented to the user as the auto-complete content, if the user continues to input a first character "p", in other words, the query content that has been input is updated to "MATCH(n: P)" and the current input character is updated to "p", "person" can be used as auto-complete content corresponding to "p" for selection by the user.

In some examples, the forming a first character string mentioned above can include the following: characters are obtained in a backward order starting from the current input character until the first symbol is reached, and are used as the above-mentioned at least one first character. It should be understood that the characters obtained here include the current input character, but do not include the first symbol. Then the first characters are concatenated based on an input sequence of the characters, to obtain the above-mentioned first character string.

The object category completion method is described above. The following describes an attribute category completion method.

Specifically, a target variable name connected by using a second symbol is obtained when the current input character is the second symbol. A target object category corresponding to the target variable name is obtained, based on the target variable name, from query content that has been input. Attribute categories corresponding to the target object category are obtained, and the attribute categories are determined as the auto-complete content corresponding to the current input character.

The second symbol here is used to connect a user-defined variable name and an attribute category of an object represented by a graphic element described by the variable name. In addition, the second symbol here is usually input after the first symbol. In other words, the first symbol is input before the second symbol.

For example, if the target query language is the ISO GQL or the cypher language, the second symbol can be ".", etc.

Taking the above-mentioned graph query statement as an example, variable names and object categories connected by second symbols are respectively "n" and "name", "r" and "starts", and "m" and "title".

As described above, objects that belong to different object categories correspond to different attribute categories. Therefore, to implement attribute category completion, an object category of an object needs to be determined first. As previously described, the first symbol is used to connect a variable name and an object category, and the first symbol is usually input before the second symbol. Therefore, attribute category completion can be implemented based on connection content (including the variable name and the object categories) of the first symbol.

In some examples, assuming that query content that has been input includes multiple first symbols, that a target object category corresponding to the target variable name is obtained includes the following: variable names connected to the first symbols are queried for a variable name that matches the target variable name; and an object category corresponding to the queried matching variable name is determined as the target object category.

Still taking the above-mentioned graph query statement as an example, assuming that query content that has been input by the user is "MATCH(n: person)-[r: rating]—(m: movie) RETURN n.", in other words, the current input character is ".", matching can be performed on "n" and the variable names "n" and "m" connected by ":" in the query content that has been input. Because "n" is successfully matched, "person" can be determined as the target object category.

Then attribute categories of "person", for example, "job" and "hobby", can be determined as auto-complete content of ".".

Similarly, after at least a part of the auto-complete content of "." is presented to the user, the user can select an attribute category from at least the part of the auto-complete content, or can continue to input a character (referred to as a second character). When the user continues to input a character, this solution can further include the following steps:

at least one second character consecutively input after the current input character is obtained, to form a second character string; and the attribute categories are queried for a matching target attribute category based on the second character string, and the target attribute category is determined as auto-complete content corresponding to the at least one second character.

For example, in the previous examples, after "job" and "hobby" are presented to the user as the auto-complete content, if the user continues to input a second character "j", in other words, the query content that has been input is updated to "MATCH(n: person)—[r: rating]—(m: movie) RETURN n.j", and the current input character is updated to "j", "job" can be used as auto-complete content corresponding to "j" for selection by the user.

In some examples, the forming a second character string mentioned above can include the following: characters are obtained in a backward order starting from the current input character until the second symbol is reached, and are used as the above-mentioned at least one second character. It should be understood that the characters obtained here include the current input character, but do not include the second symbol. Then the second characters are concatenated based on an input sequence of the characters, to obtain the above-mentioned second character string.

The methods for automatically completing a query statement for a graph database provided in the embodiments of the specification are described above. In this solution, completion using a plurality of pieces of content such as syntax keywords, object categories, and attribute categories can be performed, so that input efficiency of the graph query statement is improved, thereby improving query efficiency of the graph database.

Figure 3:
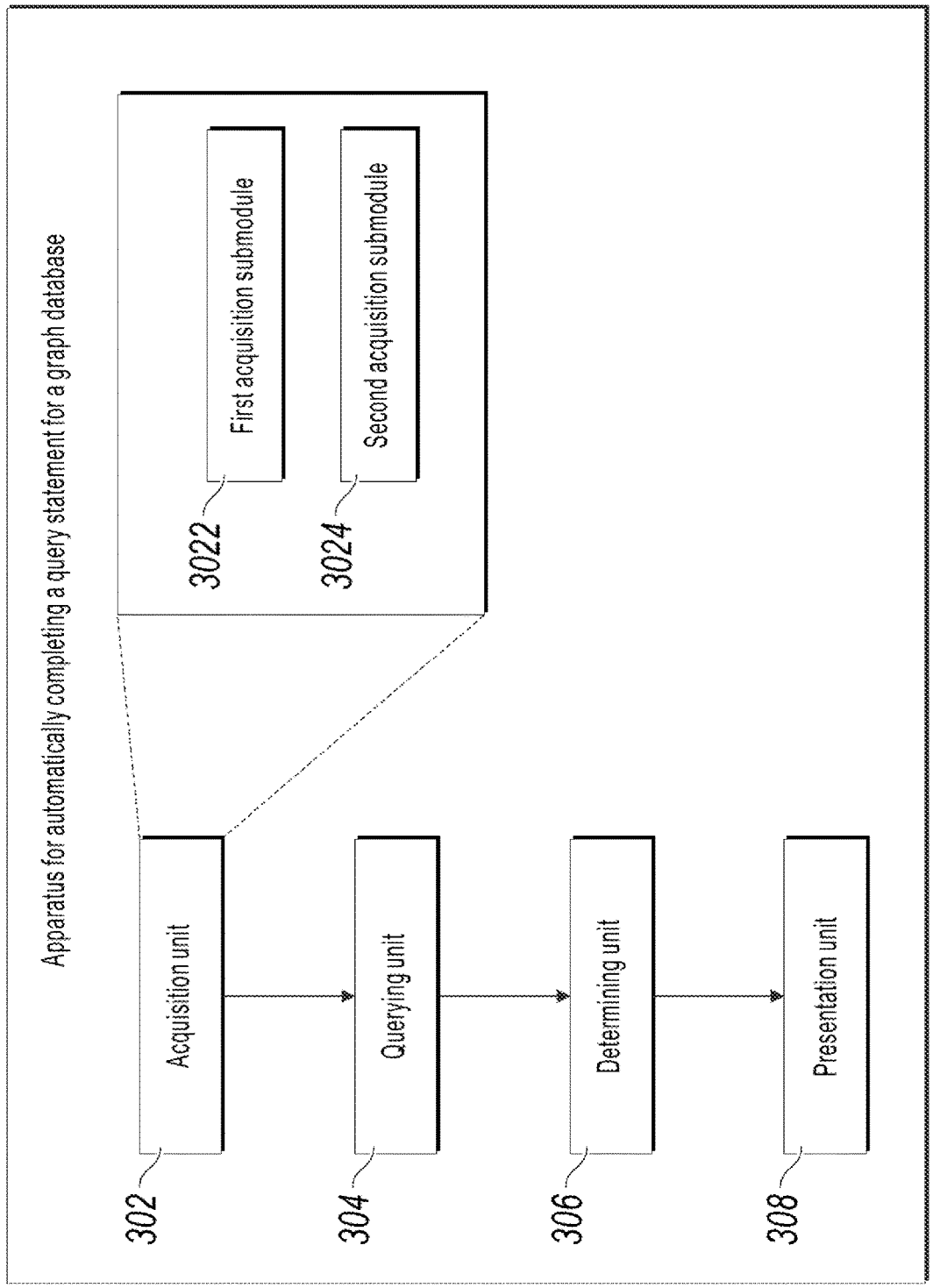
FIG. 3 is a schematic diagram illustrating an apparatus for automatically completing a query statement for a graph database, according to one or more embodiments.

Corresponding to the methods for automatically completing a query statement for a graph database, one or more embodiments of this specification further provide an apparatus for automatically completing a query statement for a graph database. As shown in FIG. 3, the apparatus can include: an acquisition unit 302, configured to obtain a current input character in a process where a user inputs a graph database query statement based on a target query language; a querying unit 304, configured to: when the current input character is not a predetermined character, query multiple syntax keywords for matching target keywords based on at least the current input character, where the predetermined character is a reserved character of the target query language; the current input character is not a beginning character; and the querying unit 304 is specifically configured to: obtain, starting from the current input character, multiple consecutive characters including the current input character in a backward order, and form a target character string based on an input sequence of the characters; and query the multiple syntax keywords for the matching target keywords based on the target character string; and a determining unit 306, configured to determine the target keywords as auto-complete content corresponding to the current input character.

Optionally, the graph database query statement is used to perform a query in a target relationship network graph in a graph database, and the predetermined character includes a first symbol used to connect a user-defined variable name and an object category of an object represented by a graphic element described by the variable name.

The acquisition unit 302 is further configured to: when the current input character is the first symbol, obtain object categories included in the target relationship network graph, and determine the object categories as the auto-complete content corresponding to the current input character.

The first symbol is included in an input combination limited by a predetermined pair of symbols, and different types of the pair of symbols indicate whether the graphic element is a node or an edge; and the acquisition unit 302 includes: a first acquisition submodule 3022, configured to: when the pair of symbols are first-type symbols corresponding to a node, obtain entity categories of entities represented by nodes in the target relationship network graph, and determine the entity categories as the auto-complete content corresponding to the current input character; and a second acquisition submodule 3024, configured to: when the pair of symbols are second-type symbols corresponding to an edge, obtain relationship categories of relationships represented by edges in the target relationship network graph, and determine the relationship categories as the auto-complete content corresponding to the current input character.

Optionally, the acquisition unit 302 is further configured to obtain at least one first character consecutively input after the current input character, to form a first character string.

The querying unit 304 is further configured to query the object categories for a matching target object category based on the first character string, and determine the target object category as auto-complete content corresponding to the at least one first character.

Optionally, the graph database query statement is used to perform a query in a target relationship network graph in a graph database, and the predetermined character includes a second symbol used to connect a user-defined variable name and an attribute category of an object represented by a graphic element described by the variable name.

The acquisition unit 302 is further configured to obtain a target variable name connected by using the second symbol when the current input character is the second symbol.

The acquisition unit 302 is further configured to obtain, based on the target variable name, a target object category corresponding to the target variable name from query content that has been input.

The determining unit 306 is further configured to obtain attribute categories corresponding to the target object category, and determine the attribute categories as the auto-complete content corresponding to the current input character.

The query content that has been input includes multiple first symbols, and each of the first symbols is used to connect a user-defined variable name and an object category of an object represented by a graphic element described by the variable name.

The acquisition unit 302 is specifically configured to query a variable name that matches the target variable name from variable names connected to the first symbols; and determine an object category corresponding to the queried variable name as the target object category.

Optionally, the acquisition unit 302 is further configured to obtain at least one second character consecutively input after the current input character, to form a second character string.

The querying unit 304 is further configured to query the attribute categories for a matching target attribute category based on the second character string, and determine the target attribute category as auto-complete content corresponding to the at least one second character.

Optionally, the apparatus further includes a presentation unit 308, configured to present at least a part of the auto-complete content to the user for selection by the user.

The functions of the functional modules of the apparatus in the above-mentioned embodiments of this specification can be implemented by performing the steps in the above-mentioned method embodiments. Therefore, a specific working process of the apparatus provided in the embodiments of this specification is omitted here for simplicity.

According to the apparatus for automatically completing a query statement for a graph database provided in the embodiments of this specification, completion using a plurality of pieces of content such as syntax keywords, object categories, and attribute categories can be performed, so that input efficiency of the graph query statement is improved, thereby improving query efficiency of the graph database.

According to one or more embodiments of another aspect, a computer-readable storage medium is further provided. The computer-readable storage medium stores a computer program, and when the computer program is executed in a computer, the computer is enabled to perform the method described with reference to FIG. 2.

According to one or more embodiments of still another aspect, a computing device is further provided, including a memory and a processor. The memory stores executable code, and when executing the executable code, the processor implements the method described with reference to FIG. 2.

The embodiments in this specification are described in a progressive way. For same or similar parts of the embodiments, mutual references can be made to the embodiments. Each embodiment focuses on a difference from other embodiments. In particular, because the device embodiments are basically similar to the method embodiments, the device embodiments are relatively simply described. References can be made to the description of the method embodiment parts for relevant parts.

The methods or the algorithm steps described in the disclosed content of this specification can be implemented by using hardware, or can be implemented by executing software instructions by a processor. The software instructions can include corresponding software modules. The software modules can be stored in a random access memory (RAM), a flash memory, a read-only memory (ROM), an erasable programmable read-only memory (EPROM), an electrically erasable programmable read-only memory (EEPROM), a register, a hard disk, a portable hard disk, a compact disc read-only memory (CD-ROM), or any other form of storage medium known in the art. An example storage medium is coupled to a processor, so that the processor can read information from the storage medium and write information to the storage medium. Certainly, the storage medium can alternatively be a part of the processor. The processor and the storage medium can be located in an ASIC. In addition, the ASIC can be located in a server. Certainly, the processor and the storage medium can alternatively exist in a server as discrete components.

A person skilled in the art should be aware that, in the above-mentioned one or more examples, functions described in this specification can be implemented by hardware, software, firmware, or any combination thereof. When this specification is implemented by the software, the functions can be stored in a computer-readable medium or transmitted as one or more instructions or code in a computer-readable medium. The computer-readable medium includes a computer storage medium and a communication medium. The communication medium includes any medium that facilitates transmission of a computer program from one place to another. The storage medium can be any available medium accessible to a general-purpose computer or a special-purpose computer.

Specific embodiments of this specification are described above. Other embodiments fall within the scope of the appended claims. In some situations, the actions or steps described in the claims can be performed in an order different from the order in the embodiments and the desired results can still be achieved. In addition, the process depicted in the accompanying drawings does not necessarily need a particular execution order to achieve the desired results. In some implementations, multi-tasking and concurrent processing is feasible or can be advantageous.

The objectives, technical solutions, and beneficial effects of this specification have been further described in detail in the above-mentioned specific implementations. It should be understood that the above-mentioned descriptions are merely specific implementations of this specification and are not intended to limit the protection scope of this specification. Any modification, equivalent replacement, improvement, etc. made based on the technical solutions of this specification shall fall within the protection scope of this specification.

What is claimed is:

1. A computer-implemented method for automatically completing a query statement for a graph database, comprising:
   obtaining a current input character in a process where a user inputs a graph database query statement based on a target query language;
   querying multiple syntax keywords for matching, as matched target keywords, target keywords based on at least the current input character when the current input character is not a predetermined character, wherein the predetermined character is a reserved character of the target query language; and
   determining the matched target keywords as auto-complete content corresponding to the current input character.

2. The computer-implemented method of claim 1, wherein:
   the current input character is not a beginning character; and
   querying multiple syntax keywords for matching target keywords, comprises:
      obtaining in a backward order, starting from the current input character, multiple consecutive characters comprising the current input character;
      forming a target character string based on an input sequence of the multiple consecutive characters; and
      querying the multiple syntax keywords for the matching target keywords based on the target character string.

3. The computer-implemented method of claim 1, wherein:
   the graph database query statement is used to perform a query in a target relationship network graph in a graph database and the predetermined character comprises a first symbol used to connect a user-defined variable name and an object category of an object represented by a graphic element described by the user-defined variable name; and comprising:
   when the current input character is the first symbol, obtaining object categories, wherein the object categories are comprised in the target relationship network graph; and
   determining the object categories as the auto-complete content corresponding to the current input character.

4. The computer-implemented method of claim 3, wherein:
   the first symbol is comprised in an input combination limited by a predetermined pair of symbols, and different types of the predetermined pair of symbols indicate whether the graphic element is a node or an edge; and
   obtaining object categories comprised in the target relationship network graph, comprises:
      when the predetermined pair of symbols are first-type symbols corresponding to a node:
         obtaining entity categories of entities represented by nodes in the target relationship network graph; and
         determining the entity categories of entities represented by nodes in the target relationship network graph as the auto-complete content corresponding to the current input character; or
      when the predetermined pair of symbols are second-type symbols corresponding to an edge:
         obtaining relationship categories of relationships represented by edges in the target relationship network graph; and
         determining the relationship categories of relationships represented by edges in the target relationship network graph as the auto-complete content corresponding to the current input character.

5. The computer-implemented method of claim 3, comprising:
   obtaining, to form a first character string, at least one first character consecutively input after the current input character;
   querying, from the object categories and based on the first character string, a matched target object category; and
   determining the matched target object category as auto-complete content corresponding to the at least one first character consecutively input after the current input character.

6. The computer-implemented method of claim 1, wherein:
   the graph database query statement is used to perform a query in a target relationship network graph in a graph database and the predetermined character comprises a second symbol used to connect a user-defined variable name and an attribute category of an object represented by a graphic element described by the user-defined variable name; and comprising:
   obtaining a target variable name connected by using the second symbol when the current input character is the second symbol;
   obtaining, based on the target variable name, a target object category corresponding to the target variable name from query content that has been input;
   obtaining attribute categories corresponding to the target object category; and
   determining the attribute categories as the auto-complete content corresponding to the current input character.

7. The computer-implemented method of claim 6, wherein:

the query content that has been input comprises multiple first symbols and each of the multiple first symbols is used to connect a user-defined variable name and an object category of an object represented by a graphic element described by the user-defined variable name.

8. The computer-implemented method of claim 7, wherein the obtaining a target object category corresponding to the target variable name, comprises:
  querying, as a queried variable name, a variable name that matches the target variable name from variable names connected to the multiple first symbols; and
  determining an object category corresponding to the queried variable name as the target object category.

9. The computer-implemented method of claim 6, comprising:
  obtaining at least one second character consecutively input after the current input character, to form a second character string;
  querying, based on the second character string, a matched target attribute category from the attribute categories; and
  determining the matched target attribute category as auto-complete content corresponding to the at least one second character consecutively input after the current input character.

10. The computer-implemented method of claim 1, comprising:
  presenting at least a part of the auto-complete content to the user for selection by the user.

11. A non-transitory, computer-readable medium storing one or more instructions executable by a computer system to perform one or more operations for automatically completing a query statement for a graph database, comprising:
  obtaining a current input character in a process where a user inputs a graph database query statement based on a target query language;
  querying multiple syntax keywords for matching, as matched target keywords, target keywords based on at least the current input character when the current input character is not a predetermined character, wherein the predetermined character is a reserved character of the target query language; and
  determining the matched target keywords as auto-complete content corresponding to the current input character.

12. The non-transitory, computer-readable medium of claim 11, wherein:
  the current input character is not a beginning character; and
  querying multiple syntax keywords for matching target keywords, comprises:
    obtaining in a backward order, starting from the current input character, multiple consecutive characters comprising the current input character;
    forming a target character string based on an input sequence of the multiple consecutive characters; and
    querying the multiple syntax keywords for the matching target keywords based on the target character string.

13. The non-transitory, computer-readable medium of claim 11, wherein:
  the graph database query statement is used to perform a query in a target relationship network graph in a graph database and the predetermined character comprises a first symbol used to connect a user-defined variable name and an object category of an object represented by a graphic element described by the user-defined variable name; and
  comprising:
    when the current input character is the first symbol, obtaining object categories, wherein the object categories are comprised in the target relationship network graph; and
    determining the object categories as the auto-complete content corresponding to the current input character.

14. The non-transitory, computer-readable medium of claim 13, wherein:
  the first symbol is comprised in an input combination limited by a predetermined pair of symbols, and different types of the predetermined pair of symbols indicate whether the graphic element is a node or an edge; and
  obtaining object categories comprised in the target relationship network graph, comprises:
    when the predetermined pair of symbols are first-type symbols corresponding to a node:
      obtaining entity categories of entities represented by nodes in the target relationship network graph; and
      determining the entity categories of entities represented by nodes in the target relationship network graph as the auto-complete content corresponding to the current input character; or
    when the predetermined pair of symbols are second-type symbols corresponding to an edge:
      obtaining relationship categories of relationships represented by edges in the target relationship network graph; and
      determining the relationship categories of relationships represented by edges in the target relationship network graph as the auto-complete content corresponding to the current input character.

15. The non-transitory, computer-readable medium of claim 13, comprising:
  obtaining, to form a first character string, at least one first character consecutively input after the current input character;
  querying, from the object categories and based on the first character string, a matched target object category; and
  determining the matched target object category as auto-complete content corresponding to the at least one first character consecutively input after the current input character.

16. The non-transitory, computer-readable medium of claim 11, wherein:
  the graph database query statement is used to perform a query in a target relationship network graph in a graph database and the predetermined character comprises a second symbol used to connect a user-defined variable name and an attribute category of an object represented by a graphic element described by the user-defined variable name; and
  comprising:
    obtaining a target variable name connected by using the second symbol when the current input character is the second symbol;
    obtaining, based on the target variable name, a target object category corresponding to the target variable name from query content that has been input;
    obtaining attribute categories corresponding to the target object category; and determining the attribute categories as the auto-complete content corresponding to the current input character.

17. The non-transitory, computer-readable medium of claim 16, wherein:
the query content that has been input comprises multiple first symbols and each of the multiple first symbols is used to connect a user-defined variable name and an object category of an object represented by a graphic element described by the user-defined variable name.

18. The non-transitory, computer-readable medium of claim 17, wherein the obtaining a target object category corresponding to the target variable name, comprises:
querying, as a queried variable name, a variable name that matches the target variable name from variable names connected to the multiple first symbols; and
determining an object category corresponding to the queried variable name as the target object category.

19. The non-transitory, computer-readable medium of claim 16, comprising:
obtaining at least one second character consecutively input after the current input character, to form a second character string;
querying, based on the second character string, a matched target attribute category from the attribute categories; and
determining the matched target attribute category as auto-complete content corresponding to the at least one second character consecutively input after the current input character.

20. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations for automatically completing a query statement for a graph database, comprising:
obtaining a current input character in a process where a user inputs a graph database query statement based on a target query language;
querying multiple syntax keywords for matching, as matched target keywords, target keywords based on at least the current input character when the current input character is not a predetermined character, wherein the predetermined character is a reserved character of the target query language; and
determining the matched target keywords as auto-complete content corresponding to the current input character.

* * * * *